US012810193B2

(12) United States Patent
Wang et al.

(10) Patent No.: US 12,810,193 B2
(45) Date of Patent: Nov. 24, 2026

(54) DUAL-HELIX QUANTUM ENCODING ARCHITECTURE AND MULTIDIMENSIONAL QUANTUM COMPUTING SYSTEM

(71) Applicant: Homatch.ai, Milpitas, CA (US)

(72) Inventors: Mingjun Wang, Saratoga, CA (US); Xiang Mao, Milpitas, CA (US)

(73) Assignee: Homatch.ai, Milpitas, CA (US)

( * ) Notice: Subject to any disclaimer, the term of this patent is extended or adjusted under 35 U.S.C. 154(b) by 0 days.

(21) Appl. No.: 19/083,366

(22) Filed: Mar. 18, 2025

(65) Prior Publication Data

US 2026/0119943 A1 Apr. 30, 2026

Related U.S. Application Data

(60) Provisional application No. 63/706,574, filed on Oct. 11, 2024.

(51) Int. Cl.
*G06N 10/40* (2022.01)
*G06N 10/70* (2022.01)

(52) U.S. Cl.
CPC ............. *G06N 10/40* (2022.01); *G06N 10/70* (2022.01)

(58) Field of Classification Search
None
See application file for complete search history.

(56) References Cited

U.S. PATENT DOCUMENTS

| | | | |
|---|---|---|---|
| 12,056,573 B2 * | 8/2024 | Blumel .................. | G06N 10/00 |
| 2009/0170220 A1 | 7/2009 | Shiotsuka et al. | |
| 2018/0121601 A1 | 5/2018 | Hahm et al. | |
| 2022/0237496 A1 | 7/2022 | Cadet | |
| 2022/0398484 A1 | 12/2022 | Padalia et al. | |

OTHER PUBLICATIONS

C. Monroe, R. Raussendorf, A. Ruthven, K. R. Brown, P. Maunz, L.-M. Duan, and J. Kim, Large Scale Modular Quantum Computer Architecture with Atomic Memory and Photonic Interconnects (Year: 2013).*

International Search report and Written Opinion issued on Mar. 30, 2026 in PCT application No. PCT/US2025/020590, 8 Pages.

* cited by examiner

*Primary Examiner* — Guerrier Merant
(74) *Attorney, Agent, or Firm* — MASCHOFF BRENNAN; Paul G. Johnson

(57) ABSTRACT

A quantum computing system may include a dual-helix quantum encoding structure a multidimensional modulation controller. The dual-helix quantum encoding structure may include a first helix chain and a second helix chain. The multidimensional modulation controller may be configured to modulate quantum information in the first and second helix chains using two or more of frequency modulation, phase modulation, and amplitude modulation. The frequency, phase, and amplitude modulation may enhance information processing, storage, parallel computation, and error correction in quantum computing systems. Alternatively or additionally, embodiments herein may provide a new direction for scaling quantum computers for large-scale, complex tasks, and may offer improvements in speed, accuracy, and efficiency.

20 Claims, 4 Drawing Sheets

DUAL-HELIX QUANTUM ENCODING ARCHITECTURE AND MULTIDIMENSIONAL QUANTUM COMPUTING SYSTEM

RELATED APPLICATION

This application claims the benefit of and priority to U.S. Provisional Application No. 63/706,574 filed Oct. 11, 2024, the entire contents of which are hereby incorporated by reference in their entirety.

TECHNICAL FIELD

The present disclosure relates to a dual-helix quantum encoding architecture and multidimensional quantum computing system.

BACKGROUND

Unless otherwise indicated herein, the materials described herein are not prior art to the claims in the present application and are not admitted to be prior art by inclusion in this section.

Quantum computers use quantum bits (qubits) for information processing, leveraging superposition and entanglement to perform complex calculations. Some example quantum computers may include several components, such as one or more of a qubit array, a quantum processor, a control system, a cryogenic refrigeration system, classical control electronics, a user interface, and a software stack.

A qubit array may be implemented using various physical systems such as superconducting circuits, trapped ions, or semiconductor quantum dots. The qubit array provides the quantum states for computation.

A quantum processor is coupled to the qubit array and is configured to perform quantum logic operations on the qubits. The quantum processor may implement single-qubit gates and multi-qubit entangling gates.

A control system may be coupled to the quantum processor and qubit array. The control system may generate and apply control signals to manipulate and measure the qubit states.

A cryogenic refrigeration system may be used to maintain the qubits and quantum processor at extremely low temperatures, often near absolute zero, to preserve quantum coherence.

Classical control electronics may interface with the quantum components to program operations, read out results, and implement error correction protocols.

Quantum error correction schemes may be employed to mitigate the effects of decoherence and errors in the quantum system.

A user interface and software stack may allow users to develop and run quantum algorithms on the system.

Such quantum computers may be designed to leverage quantum superposition and entanglement to perform certain computations exponentially faster than classical computers for specific problems. However, existing quantum computers rely mainly on single-dimensional binary encoding (0 and 1) or simple state modulation (phase and amplitude), which limits their computational capacity, storage efficiency, and makes quantum error correction more complex, especially for large-scale computations.

The subject matter claimed herein is not limited to embodiments that solve any disadvantages or that operate only in environments such as those described above. Rather, this background is only provided to illustrate one example technology area where some embodiments described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Some embodiments herein increase computational capacity and storage efficiency and simplify quantum error correction in quantum computing systems. These and other embodiments may combine frequency, phase, and amplitude modulation in a dual-helix quantum encoding structure to enhance quantum encoding, storage, and operations. This architecture may support multidimensional parallel processing and may provide a more efficient quantum error correction mechanism.

In an example embodiment, a quantum computing system includes a dual-helix quantum encoding structure and a multidimensional modulation controller. The dual-helix quantum encoding structure includes a first helix chain and a second helix chain. The multidimensional modulation controller is configured to modulate quantum information in the first and second helix chains using two or more of frequency modulation, phase modulation, and amplitude modulation.

In another example embodiment, a method for quantum computing includes modulating quantum information in a first helix chain and a second helix chain of a dual-helix quantum encoding structure using frequency modulation, phase modulation, and amplitude modulation. The method includes performing parallel quantum operations within the first helix chain and the second helix chain. The method includes implementing error correction within the first helix chain and the second helix chain using the frequency modulation, phase modulation, and amplitude modulation.

In another example embodiment, a non-transitory computer-readable storage medium includes computer-executable instructions executable by a processor device to perform or control performance of operations. The operations include modulating quantum information in a first helix chain and a second helix chain of a dual-helix quantum encoding structure using frequency modulation, phase modulation, and amplitude modulation. The operations include performing parallel quantum operations within the first helix chain and the second helix chain. The operations include implementing error correction within the first helix chain and the second helix chain using the frequency modulation, phase modulation, and amplitude modulation.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION

The present application can be best understood by reference to the embodiments described below taken in conjunction with the accompanying drawing figures, in which like parts may be referred to by like numerals.

DETAILED DESCRIPTION

Figure 1A:
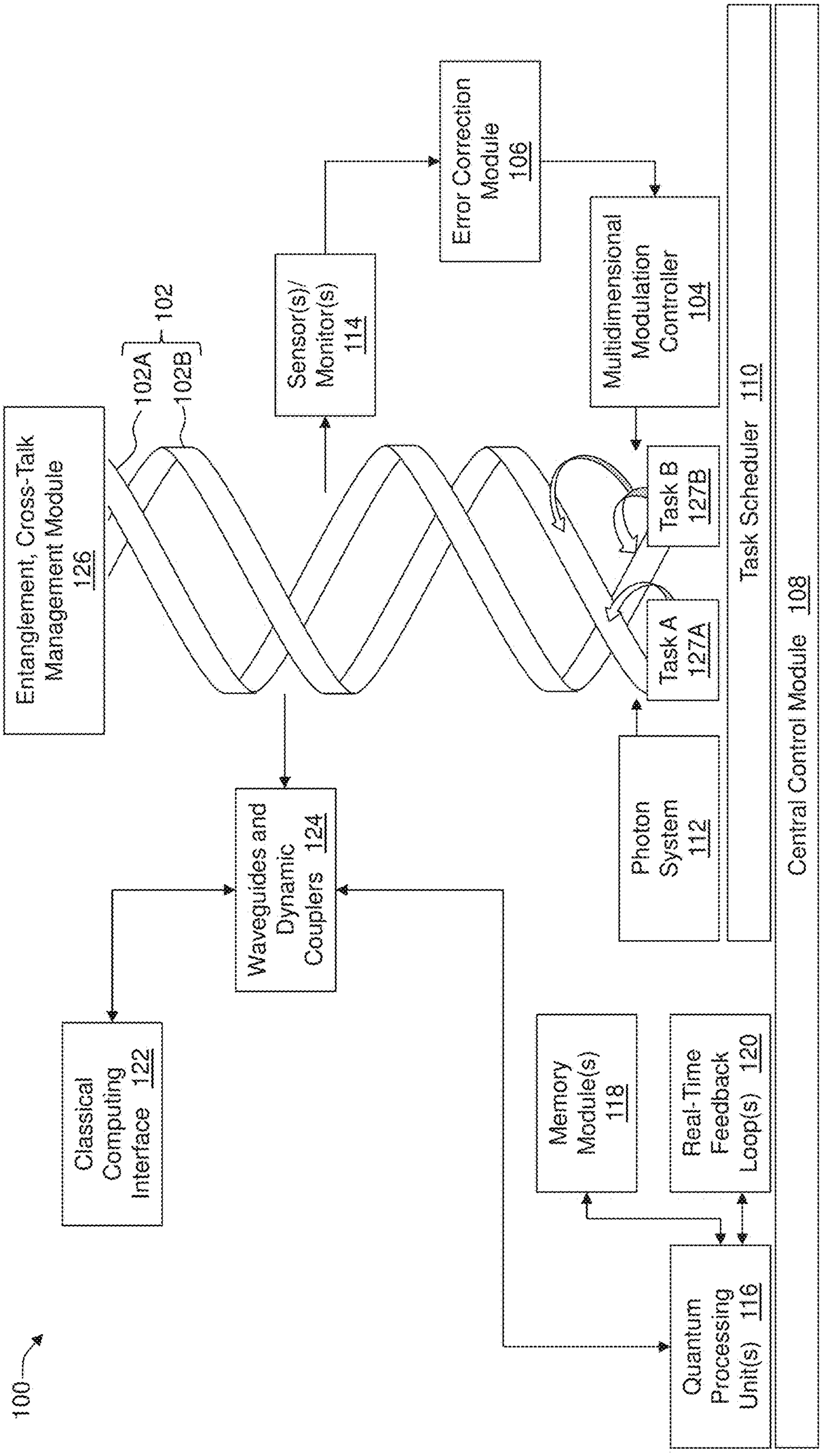
FIG. 1A illustrates an example quantum computing system that includes a dual-helix quantum encoding architecture.

To provide a more thorough understanding of various embodiments of the present invention, the following description sets forth numerous specific details, such as specific configurations, parameters, examples, and the like. It should be recognized, however, that such description is not intended as a limitation on the scope of the present invention but is intended to provide a better description of the exemplary embodiments.

Throughout the specification and claims, the following terms take the meanings explicitly associated herein, unless the context clearly dictates otherwise:

The phrase "in one embodiment" as used herein does not necessarily refer to the same embodiment, though it may. Thus, as described below, various embodiments of the disclosure may be readily combined, without departing from the scope or spirit of the invention.

As used herein, the term "or" is an inclusive "or" operator and is equivalent to the term "and/or," unless the context clearly dictates otherwise.

The term "based on" is not exclusive and allows for being based on additional factors not described unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networked environment where two or more components or devices are able to exchange data, the terms "coupled to" and "coupled with" are also used to mean "communicatively coupled with", possibly via one or more intermediary devices. The components or devices can be optical, mechanical, and/or electrical devices.

Although the following description uses terms "first," "second," etc. to describe various elements, these elements should not be limited by the terms. These terms are only used to distinguish one element from another. For example, a first sensor could be termed a second sensor and, similarly, a second sensor could be termed a first sensor, without departing from the scope of the various described examples. The first sensor and the second sensor can both be sensors and, in some cases, can be separate and different sensors.

In addition, throughout the specification, the meaning of "a", "an", and "the" includes plural references, and the meaning of "in" includes "in" and "on".

Although some of the various embodiments presented herein constitute a single combination of inventive elements, it should be appreciated that the inventive subject matter is considered to include all possible combinations of the disclosed elements. As such, if one embodiment comprises elements A, B, and C, and another embodiment comprises elements B and D, then the inventive subject matter is also considered to include other remaining combinations of A, B, C, or D, even if not explicitly discussed herein. Further, the transitional term "comprising" means to have as parts or members, or to be those parts or members. As used herein, the transitional term "comprising" is inclusive or open-ended and does not exclude additional, unrecited elements or method steps.

As used in the description herein and throughout the claims that follow, when a system, engine, server, device, module, or other computing element is described as being configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

It should be noted that any language directed to a computer should be read to include any suitable combination of computing devices or network platforms, including servers, interfaces, systems, databases, agents, peers, engines, controllers, modules, or other types of computing devices operating individually or collectively. One should appreciate the computing devices comprise a processor configured to execute software instructions stored on a tangible, non-transitory computer readable storage medium (e.g., hard drive, FPGA, PLA, solid state drive, RAM, flash, ROM, or any other volatile or non-volatile storage devices). The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges among devices can be conducted over a packet-switched network, the Internet, LAN, WAN, VPN, or other type of packet switched network; a circuit switched network; cell switched network; or other type of network.

The field of quantum computing has seen significant advancements in recent years. However, several challenges remain in the development of practical and scalable quantum computing systems. These challenges may include limitations in computational capacity, storage efficiency, and error correction mechanisms.

Some quantum computing architectures rely on single-dimensional binary encoding or simple state modulation techniques. These approaches may face constraints when handling large-scale computations or complex quantum operations. The information processing capacity and computation speed of such systems may be limited by the encoding methods employed.

Furthermore, some quantum information encoding techniques may not fully utilize the potential of quantum resources. The amount of information that can be stored and processed in a single qubit may be restricted by some encoding methods. This limitation may result in inefficient use of quantum resources and reduced overall system performance.

Quantum error correction is another area that may present challenges in some quantum computing systems. Conventional error correction methods may require complex algorithms and additional qubits, potentially making them resource-intensive. The vulnerability of quantum systems to decoherence and environmental disturbances may further complicate error correction efforts.

These challenges highlight the need for innovative approaches in quantum computing architecture, information encoding, error correction, and system integration. Advancements in these areas may pave the way for more powerful, reliable, and practical quantum computing solutions capable of addressing complex computational tasks across various fields of science and technology.

Some embodiments disclosed herein may address one or more of the challenges of other quantum computing systems, such as low information processing capacity, limited computation speed, insufficient storage efficiency, and complex error correction mechanisms. For example, one or more embodiments herein may overcome one or more of the foregoing challenges by leveraging a dual-helix quantum encoding architecture. Such an architecture may provide one or more of multidimensional information processing, parallel computation speed, enhanced storage efficiency, optimized error correction, or scalability for large-scale quantum computing tasks. In more detail, multidimensional information processing may expand quantum encoding beyond simple binary states, leveraging frequency, phase, amplitude, and orbital angular momentum (OAM) for higher computational density. Parallel computation speed may be improved through the dual-helix structure enabling simultaneous qubit processing across multiple helical chains, increasing quantum throughput. The system may improve quantum memory utilization to enhance storage efficiency by storing and manipulating high-dimensional quantum states. The architecture may support advanced quantum error correction techniques, reducing decoherence effects while maintaining high-fidelity quantum gates. The dual-helix structure may provide an inherently scalable platform, supporting a greater number of qubits than traditional 2D architectures.

An example dual-helix quantum encoding architecture may include a dual-helix structure and one or more of a multi-dimensional quantum modulation system, a parallel processing architecture, or an error tolerance and correction mechanism. For example, the dual-helix quantum encoding architecture may encode quantum bits (qubits) within the dual-helix structure using multidimensional modulation, which may include frequency modulation (FM), phase modulation (PM), and/or amplitude modulation (AM). Each helix chain may be capable of storing more quantum information per qubit, while multiple helix chains may operate in parallel. Through multi-dimensional quantum modulation (e.g., frequency, phase, and/or amplitude modulation), some embodiments may process and manipulate multiple quantum states simultaneously. In some embodiments, frequency modulation may represent basic quantum states (e.g., $|0\rangle$ and $|1\rangle$), phase modulation may enable quantum superposition and interference control, and amplitude modulation may enhance error correction by enabling redundancy mechanisms. The dual-helix structure may inherently support parallel quantum processing, where two or more helix chains execute different quantum tasks concurrently. Information processing within each helix chain may be managed through controlled modulation of frequency, phase, and amplitude, to improve parallel processing capability and/or efficiency. Alternatively or additionally, the architecture may leverage multidimensional modulation to implement an efficient quantum error correction (QEC) mechanism. If one modulation dimension encounters an error (e.g., due to noise or decoherence), other dimensions can compensate for it, reducing the overall impact of quantum errors.

FIG. 1A illustrates an example quantum computing system 100 (hereinafter "system 100") that includes such a dual-helix quantum encoding architecture, arranged in accordance with at least one embodiment herein. In particular, the system 100 includes a dual-helix quantum encoding structure 102 (hereinafter "dual-helix structure 102"), a multidimensional modulation controller 104 (hereinafter "controller 104"), and an error correction module 106. The system 100 may further include a central control module 108, a task scheduler 110, a photon system 112, one or more sensors or monitors 114 (hereinafter generically "sensors 114" or "sensor 114"), one or more quantum processing units (QPUs) 116, one or more memory modules 118, one or more real-time feedback loops 120, a classical computing interface 122, one or more waveguides and/or dynamic couplers 124, and an entanglement and cross-talk management module 126 (hereinafter "entanglement module 126").

In general, the dual-helix structure 102 may include a first helix chain 102A and a second helix chain 102B. Each of the first helix chain 102A and the second helix chain 102B may include at least one of high-transparency quartz, fused silica, silicon nitride (SiN), lithium niobate ($LiNbO_3$), or other suitable material(s). The controller 104 may be configured to modulate quantum information in the first and second helix chains 102A, 102B using two or more of frequency modulation, phase modulation, and amplitude modulation. The dual-helix structure 102 may be configured to perform parallel quantum operations within the first helix chain 102A and the second helix chain 102B, e.g., under the direction or control of one or more of the central control module 108 or the task scheduler 110. The error correction module 106 may be configured to implement error correction within the first and second helix chains 102A, 102B using frequency modulation, phase modulation, and amplitude modulation provided through the controller 104.

The helix chains 102A, 102B may operate in parallel, each processing different quantum tasks simultaneously. The architecture of the system 100 may dynamically assign tasks to different chains 102A, 102B based on the complexity of the computations. In some embodiments, this may ensure balanced load distribution. For example, FIG. 1A depicts two example tasks 127A, 127B assigned to the helix chains 102. In this example, the task 127A is a relatively simple task assigned completely to the second helix chain 102B, while the task 127B is more complex and is divided up with a larger portion being assigned to the first helix chain 102A and a smaller portion being assigned to the second helix chain 102B. Such an assignment and division of tasks may balance load distribution, e.g., the task 127A and smaller portion of the task 127B assigned to the second helix chain 102B may be approximately equal to the larger portion of the task 127B assigned to the first helix chain 102A in this example.

The task scheduler 110 may manage the distribution of quantum computing tasks across the helix chains 102A, 102B, which may optimize the processing power of the system 100 in some embodiments. The task scheduler 110 may also monitor frequency, phase, and/or amplitude variations across the helix chains 102A, 102B to ensure synchronized operation. Alternatively or additionally, the task scheduler 110 may perform load balancing across the first and second helix chains 102A, 102B.

The system 100 may monitor, e.g., constantly or continuously, the modulated dimensions of frequency, phase, and amplitude of the helix chains 102A, 102B. For example, the sensors 114 may monitor the modulated dimensions of each of the first and second helix chains 102A, 102B. If one modulated dimension experiences an error (e.g., a phase drift), the system 100 may detect it through real-time monitoring, e.g., by the sensors 114, and correct it using the unaffected dimensions, e.g., using the error correction module 106, to restore an intended quantum state and/or maintain quantum state coherence.

One or more specific quantum error correction algorithms may be implemented, e.g., in or by the error correction module 106, to utilize redundancy provided by multidimensional modulation. For instance, if an error occurs in frequency modulation, the phase and/or amplitude may be adjusted to compensate for the error.

As an example, in the case of quantum error correction, the system 100 may utilize the multiple dimensions (frequency, phase, amplitude) to detect and correct errors. For instance, if one helix chain 102A, 102B exhibits a frequency deviation due to noise, the sensors 114 and/or the error correction module 106 may detects this through phase shifts or amplitude reductions. The system 100, using the error correction module 106, may dynamically adjust the amplitude or phase of an adjacent helix chain 102A, 102B to restore the quantum state and maintain coherence. Such error correction may ensure that errors from external noise or environmental fluctuations do not propagate through the system 100.

The performance of a quantum computing system that includes a dual-helix structure, such as the dual-helix structure 102, may be significantly better than in traditional binary quantum computing systems. For example, in a large-scale quantum computing task involving factorization, the dual-helix system may process significantly more data in parallel compared to traditional binary quantum computing. Simulations by the instant inventors have shown that the dual-helix system's parallel processing efficiency is up to 32 times higher than standard quantum bit operations due to multidimensional modulation and the use of multiple helix chains. Further simulations have shown that the dual-helix system detects phase drifts and corrects them with a success rate of over 98%, demonstrating the robustness of the error correction mechanism.

In an example implementation, the classical computing interface 122 of FIG. 1A may be configured to receive classical data input. The classical computing interface 122 may be configured to convert the classical data input into quantum information suitable for processing by the dual-helix structure 102 and/or any of the QPUs 116. The classical computing interface 122 may be configured to transmit the quantum information to the controller 104 for modulation and processing in the first and second helix chains 102A, 102B. The classical computing interface 122 may be configured to convert quantum computation results from the dual-helix structure 102 back into classical data output.

The dual-helix quantum encoding architecture embodied in the system 100 of FIG. 1 may serve as a foundation for transmitting, receiving, and decoding quantum-encoded photons. The system 100 may support encoding and transmission functionalities as well as quantum processing and memory/storage integration.

Figure 1B:
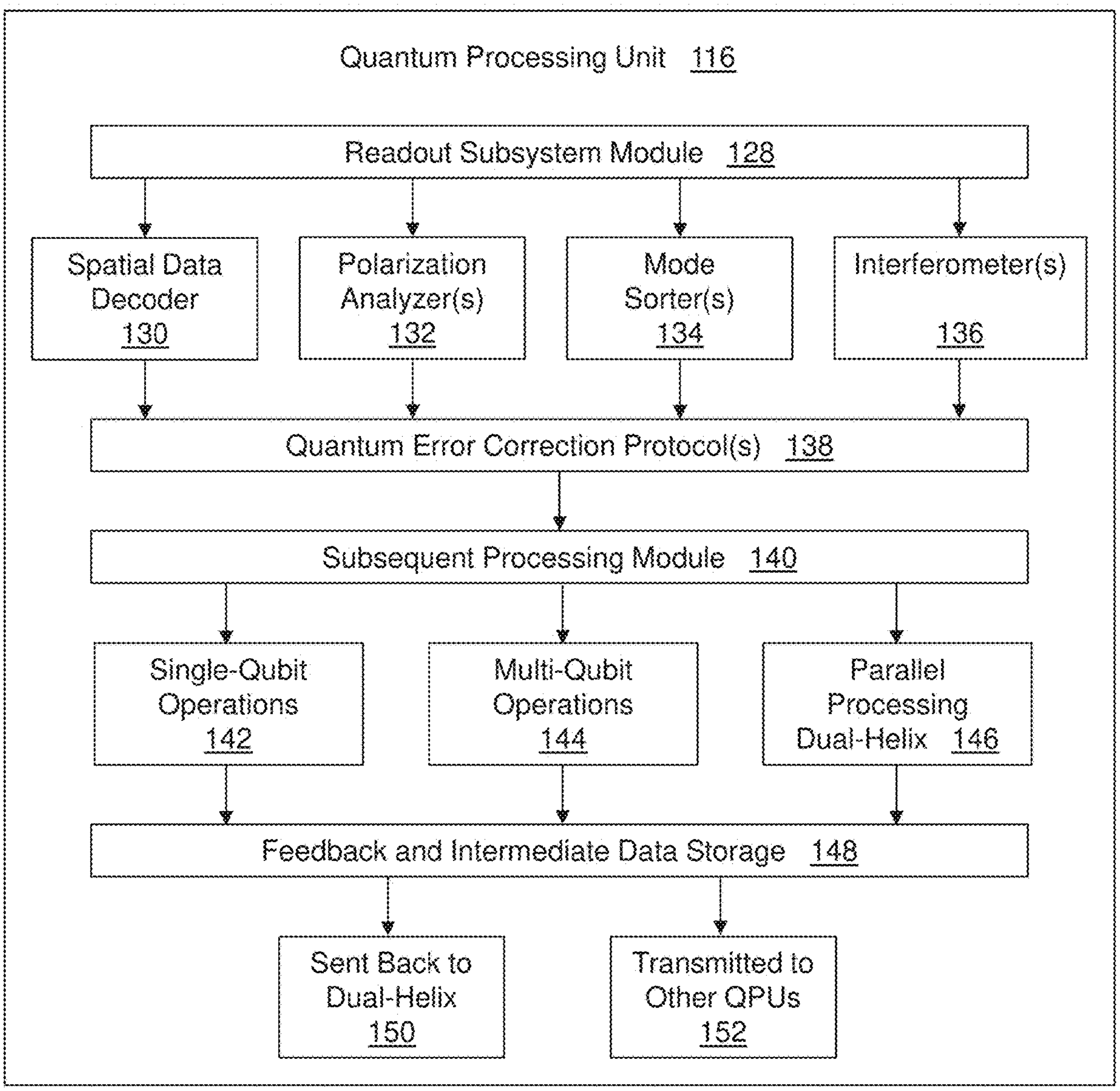
FIG. 1B illustrates an example implementation of a quantum processing unit (QPU) included in the quantum computing system of FIG. 1A.

The system 100 may include or support quantum gates and circuits for performing operations on qubits stored within the helix chains 102A, 102B, examples of which are described with respect to FIG. 1B and which may be incorporated into the dual-helix structure 102. Processing may occur at designated quantum nodes along each helix chain 102A, 102B, where modulation of frequency, phase, and amplitude, e.g., using the controller 104, may enable operations such as quantum logic gates (e.g., CNOT, Hadamard).

The parallel nature of the helix chains 102A, 102B may allow for concurrent quantum computations. The task scheduler 110 may dynamically assign tasks across the helix chains 102A, 102B to optimize, or at least improve, computational throughput. As an example, for tasks like factorization, the dual-helix structure 102 may process intermediate results in parallel, leveraging multidimensional quantum encoding for higher efficiency.

Nodes within the dual-helix structure 102 may act as quantum memory units, storing quantum states encoded via frequency, phase, and amplitude modulation.

Multidimensional modulation, e.g., as provided by the controller 104, may provide inherent redundancy for error correction, ensuring the stability of stored quantum information against decoherence or environmental noise.

The use of multiple helix chains 102A, 102B in the dual-helix structure 102 may increase storage density, allowing the system 100 to handle larger quantum datasets and intermediate results.

The dual-helix quantum encoding architecture depicted in FIG. 1A may be combined with conventional computing systems to create a hybrid quantum-classical system. For example, the classical computing interface 122 may receive classical data inputs and convert them into quantum-encoded information for processing and transmit quantum computation results back as classical data outputs. Quantum-classical hybridization may allow classical processors (e.g., CPUs, GPUs) to manage scheduling, optimization, and error correction tasks and/or to handle preprocessing/post-processing of quantum states for tasks such as quantum machine learning or variational algorithms. Such hybrid systems may leverage the advantages of both classical and quantum computing, enabling more efficient cryptographic, optimization, and AI-driven computations.

Some example hybrid quantum-classical computing use cases include data preprocessing, postprocessing, and optimization problems. For instance, classical systems may: preprocess classical data before encoding it into quantum states, improving initial conditions for quantum computations; and postprocess quantum results after measurement, refining output data and reducing noise. Alternatively or additionally, classical systems may operate iteratively alongside quantum processors for: quantum machine learning (e.g., optimizing quantum neural networks, parameter tuning for variational circuits); and variational quantum algorithms (VQAs) where a classical optimizer refines quantum circuit parameters.

Hybrid approaches as described herein may leverage the strengths of both computing paradigms: quantum components may handle high-dimensional parallel computations (e.g., superposition, entanglement); and classical components may provide stability, control, and error mitigation, ensuring operational efficiency.

FIG. 1B illustrates an example implementation of the QPU 116 of FIG. 1A, arranged in accordance with at least one embodiment herein. As illustrated, the QPU 116 of FIG. 1B may include one or more of a readout subsystem module 128 (hereinafter "readout module 128"), a spatial data decoder 130, one or more polarization analyzers 132, one or more mode sorters 134, one or more interferometers 136, one or more quantum error correction protocols 138, a subsequent processing module 140, one or more single-qubit operations 142, one or more multi-qubit operations 144, a parallel processing dual-helix 146, and a feedback and intermediate data storage 148. The single-qubit operations 142 may include, for example, a Hadamard gate or other suitable single-qubit operations. The multi-qubit operations 144 may include, for example, a controlled NOT gate (C-NOT), a Toffoli gate (or controlled-CNOT or CCNOT gate or SAWP gate), or other suitable multi-qubit operations. The parallel processing dual-helix 146 may be a subset or functional implementation of the dual helix structure 102 in FIG. 1A. The parallel processing dual-helix 146 may be optimized for use within a single QPU 116 (whereas the dual helix structure 102 may operate at the system level). The dual helix structure 102 may be a core component of the overall system 100 and may be integrated into one or more QPUs (116). However, the dual helix structure 102 may have has broader functionality beyond a single QPU, supporting multiple QPUs and system wide parallel operations. Individual QPUs (116) may contain or include a localized implementation of a dual helix structure, referred to as the parallel processing dual helix 146 herein. The feedback and intermediate data storage 148 may output data that may be, e.g., sent back to the dual-helix structure 102 of FIG. 1A at block 150 and/or transmitted to one or more other QPUs at block 152.

Figure 1C:
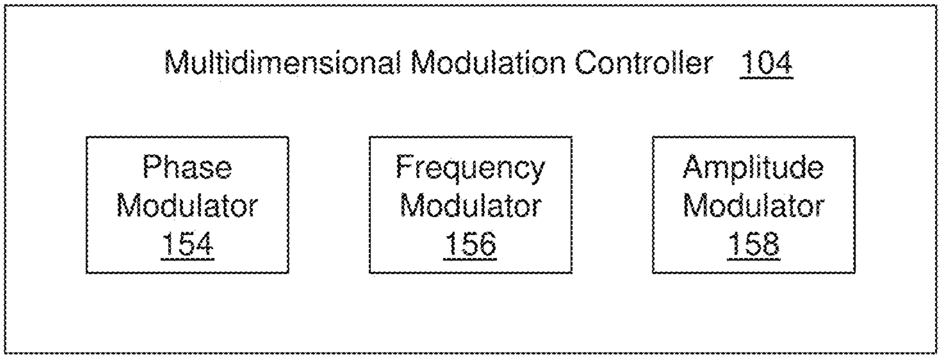
FIG. 1C illustrates an example implementation of a multidimensional modulation controller included in the quantum computing system of FIG. 1A.

FIG. 1C illustrates an example implementation of the controller 104 of FIG. 1A, arranged in accordance with at least one embodiment herein. The controller 104 may modulate the frequency, phase, and/or amplitude of each helix chain 102A, 102B in real-time. The controller 104 may ensure that each helix chain 102A, 102B operates at an optimal modulation level to prevent overlap or signal degradation.

As illustrated, the controller 104 of FIG. 1C may include a phase modulator 154, a frequency modulator 156, and/or an amplitude modulator 158. In general, each of the phase modulator 154, the frequency modulator 156, and the amplitude modulator 158 may be configured to modulate, respectively, the phase, the frequency, and the amplitude of the dual-helix structure 102 of FIG. 1A. The controller 104 modulating the phase, frequency, and/or amplitude of the dual-helix structure 102 may include the controller 104 modulating the properties of individual photons that are processed at the various nodes of the dual-helix structure 102, rather than modifying structural properties of the dual-helix structure 102 itself. In particular, the controller 104 may modulate the phase, frequency, and amplitude of individual photons or qubits as they are processed within the dual-helix structure 102. The dual-helix structure 102 may remain a stable architectural framework, within which individual quantum states may be controlled dynamically.

In this and other embodiments, the dual-helix structure 102 may be designed to maximize the information processing capacity of each qubit by incorporating multiple dimensions of modulation, e.g., frequency, phase, and amplitude, within the dual-helix structure 102. Each helix chain 102A, 102B may store quantum information.

For example, each helix chain 102A, 102B may operate at a modulated frequency range (e.g., 1 GHz to 10 GHz), representing quantum states like $|0\rangle$ and $|1\rangle$. Different frequencies may correspond to different base quantum states. The frequency modulator 156 may modulate the frequency of each helix chain 102A, 102B (and specifically of photons within each helix chain 102A, 102B).

Alternatively or additionally, a frequency monitoring and control system may be implemented by the frequency modulator 156, together with one or more sensors 114 and/or the error correction module 106. The frequency monitoring and control system may ensure that frequency modulation across the helix chains 102A, 102B remains within a predetermined range. When frequency deviations occur (e.g., as detected by one or more of the sensors 114), the frequency monitoring and control system (the error correction module 106 and/or the frequency modulator 156) may adjust the frequency of one or both of the helix chains 102A, 102B to realign quantum states. The frequency monitoring and control system may monitor frequency modulation across the helix chains 102A, 102B, e.g., using a corresponding frequency sensor or monitor within the sensors 114, detect frequency deviations in the first helix chain or the second helix chain 102A, 102B, e.g., using the error correction module 106, and/or adjust a frequency of one or both of the helix chains 102A, 102B to realign quantum states in the helix chains 102A, 102B, e.g., using the frequency modulator 156 of the controller 104.

Phase modulation, as implemented by the phase modulator 154, may be used to create quantum superposition within the dual-helix structure 102. Each phase shift in the dual-helix structure 102 may represent changes in the quantum state, allowing the encoding of superposed states like $(|0\rangle + |1\rangle)/\sqrt{2}$ and/or others. The phase modulator 154 may control phase across the entire system 100 (by modulating phase of photons or qubits within the dual-helix structure 102), ensuring synchronization.

Alternatively or additionally, a phase coupling mechanism may be implemented using the phase modulator 154, together with one or more sensors 114, and/or the error correction module 106. The phase coupling mechanism may ensure phase synchronization between the helix chains 102A, 102B to reduce computational errors caused by phase misalignment. The phase coupling mechanism may detect phase drifts (e.g., using a phase sensor of the sensors 114) and correct misalignment by adjusting the phase of the affected helix chain 102A, 102B via the error correction module 106 and/or the phase modulator 154 of the controller 104. The phase synchronization across the helix chains 102A, 102B may minimize, or at least reduce, computational errors due to, e.g., phase misalignment between the helix chains 102A, 102B.

Amplitude modulation, as implemented by the amplitude modulator 158, may increase the capacity of the system 100 for error correction. By dynamically adjusting the amplitude, the system 100 may counteract errors that arise from environmental disturbances or decoherence. The amplitude modulator 158 may control amplitude across the entire system 100 (by modulating amplitude of photons or qubits within the dual-helix structure 102).

Figure 1D:
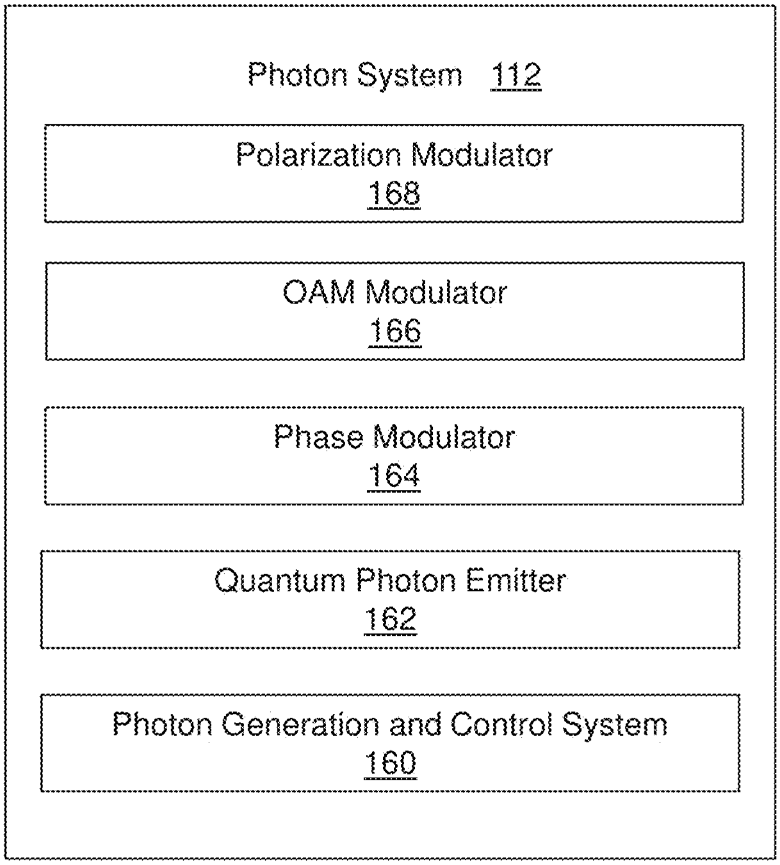
FIG. 1D illustrates an example implementation of a photon system included in the quantum computing system of FIG. 1A.

FIG. 1D illustrates an example implementation of the photon system 112 of FIG. 1A, arranged in accordance with at least one embodiment herein. As illustrated, the photon system 112 of FIG. 1D may include a photon generation and control system 160, a quantum photon emitter 162, a phase modulator 164, an orbital angular moment (OAM) modulator 166, and/or a polarization modulator 168. In general, each of the phase modulator 164, the OAM modulator 166, and the polarization modulator 168 may be configured to modulate, respectively, the phase, the OAM, and the polarization of photons the photon system 112 provides to the dual-helix structure 102 of FIG. 1A.

In some embodiments, the system 100 with its various components as depicted in FIGS. 1A-1D, may operate generally as follows. Referring to FIGS. 1A and 1C, the controller 104 may modulate properties of each of the first and second helix chains 102A, 102B of the dual helix structure 102 of FIG. 1A. For example, the phase modulator 154 (FIG. 1C) of the controller 104 may modulate the phase of each of the first and second helix chains 102A, 102B. The frequency modulator 156 (FIG. 1C) of the controller 104 may modulate the frequency of each of the first and second helix chains 102A, 102B. The amplitude modulator 158 (FIG. 1C) of the controller 104 may modulate the amplitude of each of the first and second helix chains 102A, 102B.

Referring to FIGS. 1A and 1D, the photon system 112 may generally generate single photons and provide them to the dual-helix structure 102. In more detail, the photon generation and control system 160 may generate photons which may be emitted by the quantum photon emitter 162. Quantum information (e.g., input data for a computation) may be encoded into each photon by modulating one or more of each photon's phase, OAM, and/or polarization, e.g., using the phase modulator 164, the OAM modulator 166, and/or the polarization modulator 168. The phase modulator 164, the OAM modulator 166, and the polarization modulator 168 are depicted as being part of the photon system 112 that is external to the dual-helix structure 102. In other embodiments, the phase modulator 164, the OAM modulator 166, and/or the polarization modulator 168 may be integrated into the dual-helix structure 102, e.g., to modulate photon properties during computation rather than beforehand.

The OAM modulator 166 may encode high-dimensional information by modulating the OAM of each photon. For example, a photon may be assigned OAM values of +1, −1, or higher-order modes. These states may correspond to distinct quantum information channels, increasing encoding capacity.

The polarization modulator 168 may encode binary quantum states by modulating photon polarization. For example, horizontal or vertical polarization may represent binary quantum states $|0\rangle$ or $|1\rangle$. Circular polarization states (left or right) may be used for alternative qubit encoding schemes (e.g., polarization-entangled qubits).

The phase modulator 164 may add extra encoding layers for complex state representation. For example, photons may be modulated to include arbitrary phase values, which may enhance the encoding of multi-qubit states. Alternatively or additionally, this may enable interference-based quantum computing and multi-photon entanglement schemes. Whereas the phase modulator 154 of FIG. 1C may control phase across the entire system, the phase modulator 164 of FIG. 1D may operate within a QPU 116, handling localized phase corrections for specific quantum gate operations.

The waveguides and dynamic couplers 124 are depicted in FIG. 1A as being external to the dual-helix structure 102. In other embodiments, one or more of the waveguides and/or dynamic couplers 124 may be integrated directly into and/or embedded within the dual-helix structure 102, facilitating internal routing of encoded photons between processing nodes. Encoded photons (e.g., modulated in phase, OAM, and/or polarization) may be routed through waveguides embedded in the dual-helix structure 102. Dynamic couples may selectively direct encoded photons to an appropriate processing unit (e.g., any of the QPUs 116). The waveguides and dynamic couplers may include or be included in the waveguides and dynamic couplers 124 of FIG. 1A, for instance. The waveguides and dynamic couplers (whether external to and/or integrated within the dual-helix structure 102) may ensure efficient quantum state transfer between subsystems.

Referring to FIGS. 1A-1B, each QPU 116 includes a subsystem, such as the readout subsystem module 128, to detect and decode photons. The readout subsystem module 128 may include the spatial data decoder 130, the polarization analyzer 132, the mode sorter 134, and/or the interferometer 136. The readout subsystem module 128 may detect the incoming photons (received from the dual helix structure 102 via the waveguides and dynamic couplers 124) and extract quantum states using, e.g., the polarization analyzer 132 to detect polarization of each photon, the mode sorter 134 to detect OAM of each photon, and/or the interferometer 136 to detect the phase of each photon. The extracted quantum states may be mapped to qubits in the QPU 116 for subsequent processing. Alternatively or additionally, classical information (e.g., bits) or other information may be encoded in the spatial location of each photon at the dual-helix structure 102 which may be extracted by the spatial data decoder 130 when the photons are received at the QPU 116.

The quantum error correction protocols 138 may be applied to ensure data integrity during transmission and decoding. The quantum error correction protocols 138 may include surface codes, Shor codes, or other suitable quantum error detection and/or correction protocols. The quantum error correction protocols 138 may be part of and/or implemented by the error correction module 106 of FIG. 1A. The quantum error correction protocols 138 may be an internal component or implementation of the broader error correction module 106. The QPU 116 may execute the quantum error correction protocols 138 as part of its quantum processing. Higher level error correction functionality (e.g., system wide monitoring, real time adjustments, and redundancy-based corrections) may be managed by error correction module 106. The error correction module 106 may oversee the entire dual helix structure 102, whereas the quantum error correction protocols 138 may focus more specifically on correcting individual qubit errors within the QPU 116. Thus, in some embodiments, the error correction module 106 in FIG. 1A encompasses the quantum error correction protocols 138 in FIG. 1B, integrating them into the system 100.

The subsequent processing module 140 may include the single-qubit operations 142, the multi-qubit operations 144, and/or the parallel processing dual-helix 146. The QPU 116 may perform single-qubit gate operations 142 (e.g., X, Z, Hadamard gates) to manipulate individual qubits based on a given computation task. For example, a Hadamard gate may be implemented in the single-qubit operations 142 by the subsequent processing module 140 to create a superposition state from an input state. The QPU 116 may perform multi-qubit gate operations 144 to, e.g., entangle qubits or perform conditional operations. For example, a CNOT gate may be implemented in the multi-qubit operations 144 by the subsequent processing module 140 to flip a target qubit's state based on a control qubit's state. The QPU 116 may leverage the parallel nature of the parallel processing dual-helix 146 (which may have a same or similar configuration as the dual-helix structure 102 of FIG. 1A) to perform operations on multiple qubits simultaneously, distributed across helix chains. The QPU 116 may also execute multi-qubit gate operations 144, such as CNOT gates, Toffoli gates, and/or other gates. CNOT gates flip a target qubit's state based on a control qubit's state. Toffoli gates (and/or CCNOT gates) may be implemented for complex multi-qubit conditional logic. Alternatively or additionally, the QPU 116 may leverage the parallel processing dual-helix 146 (which may have a similar or identical configuration to the dual-helix structure 102 of FIG. 1A) to perform simultaneous quantum operations distributed across multiple qubits and helix chains.

Processed quantum states generated by the subsequent processing module via the single-qubit operations 142, the multi-qubit operations 144, and/or the parallel processing dual-helix 146 may be sent back to the dual-helix structure 102 of FIG. 1A for storage or further routing, as indicated at block 150, and/or transmitted to other QPUs 116 for additional computation, as indicated at block 152. Quantum memory modules, such as the memory module 118 of FIG. 1A, may store intermediate results or checkpointed states for multi-step computations.

Referring to FIG. 1A, the central control module 108 may coordinate data flow between the dual-helix structure 102 and the QPUs 116, and may ensure that operations are synchronized. The central control module 108 may dynamically allocate QPU resources based on task priority and node availability. The real-time feedback loops 120 may monitor photon fidelity, gate execution, and/or routing efficiency. Adjustments may be made dynamically, e.g., as part of the real-time feedback loops 120, to minimize losses and optimize performance.

An example use case of the system 100 of FIG. 1A may involve solving a combinatorial optimization problem using the Variational Quantum Eigensolver (VQE) and may involve encoding, processing, iteration, and output. For encoding, input problem parameters may be encoded into photons within the dual-helix structure, e.g., using the photon system 112 (or more specifically the phase modulator 164, the OAM modulator 166, and the polarization modulator 168 of FIG. 1D). For processing, the QPU 116 may execute quantum circuits (e.g., in the subsequent processing module 140 of FIG. 1B) to compute energy states. Intermediate results may be routed back to the dual-helix structure 102 for temporary storage. For iteration, a classical computing system, which may be accessed via the classical computing interface 122 of FIG. 1A, may optimize parameters based on quantum results to update the encoding for subsequent iterations. For output, an optimized solution may be extracted after several iterations.

Integration of the dual-helix structure 102 in or with any of the QPUs 116 may include one or more of the following advantages. First, multiple quantum operations may be executed simultaneously across distributed nodes in the dual-helix structure 102. Second, multi-dimensional quantum states may enable compact and efficient data representation. Third, the modular nature of the dual-helix architecture may support the addition of more nodes and QPUs 116 as computational demands grow. Fourth, redundant encoding and real-time error correction may ensure robust operations in noisy quantum environments.

Quantum superposition is a fundamental principle of quantum mechanics that allows quantum systems to exist in multiple states simultaneously. In the context of quantum computing, superposition enables qubits to represent both 0 and 1 states at the same time, in contrast to classical bits which can only be in one state at a time. This property may allow quantum computers to perform certain calculations exponentially faster than classical computers for specific problems.

In the system 100 or FIG. 1A, superposition may be implemented and controlled through phase modulation of quantum states encoded in the dual-helix structure 102. The phase modulation may allow for the creation and manipulation of superposed states within each helix chain 102A, 102B. For example, a qubit in superposition may be represented as $(|0\rangle+|1\rangle)/\sqrt{2}$, where $|0\rangle$ and $|1\rangle$ are the basis states.

The system 100 of FIG. 1A may leverage superposition in one or more of the following ways:

Phase modulation (e.g., by the phase modulator 154) may be used to create and control superposed states within each helix chain 102A, 102B. By adjusting the phase, the system 100 may generate various superposition states.

The parallel nature of the dual-helix structure 102 may allow for simultaneous superposition of multiple qubits across different helix chains 102A, 102B, potentially enabling more complex quantum operations.

The error correction module 106 may utilize superposition to detect and correct errors. By creating superposed states that are sensitive to specific types of errors, the system may more efficiently identify and mitigate quantum noise and decoherence.

Superposition may be employed in the QPUs 116 to perform quantum logic operations on the encoded states. These operations may include creating superpositions, entangling qubits, and implementing quantum gates.

Quantum memory modules, such as the memory modules 118, may store superposed states, allowing for the preservation of quantum information between processing steps.

By incorporating superposition into various aspects of the system 100, the system 100 may achieve enhanced computational power and flexibility compared to classical systems. This may enable more efficient solutions to complex problems in fields such as cryptography, optimization, and quantum simulation.

The dual-helix quantum encoding architecture of the system 100 of FIG. 1A may deliver performance improvements for quantum computing systems in one or more of enhanced information storage and processing capacity, increased parallel processing capability, and/or improved error tolerance and correction. Regarding information storage and processing capacity, by utilizing multidimensional modulation, the system 100 may process more information within the same storage space, increasing information density by up to 32 times or more. Regarding parallel processing capability, the parallel design of the helix chains 102A, 102A allows the system 100 to handle numerous complex tasks simultaneously, significantly improving computation speed. Regarding error tolerance and correction, the multi-dimensional modulation and coupling mechanism of the system 100 provides an efficient error correction system, minimizing errors caused by decoherence and improving computational accuracy and stability.

Figure 2:
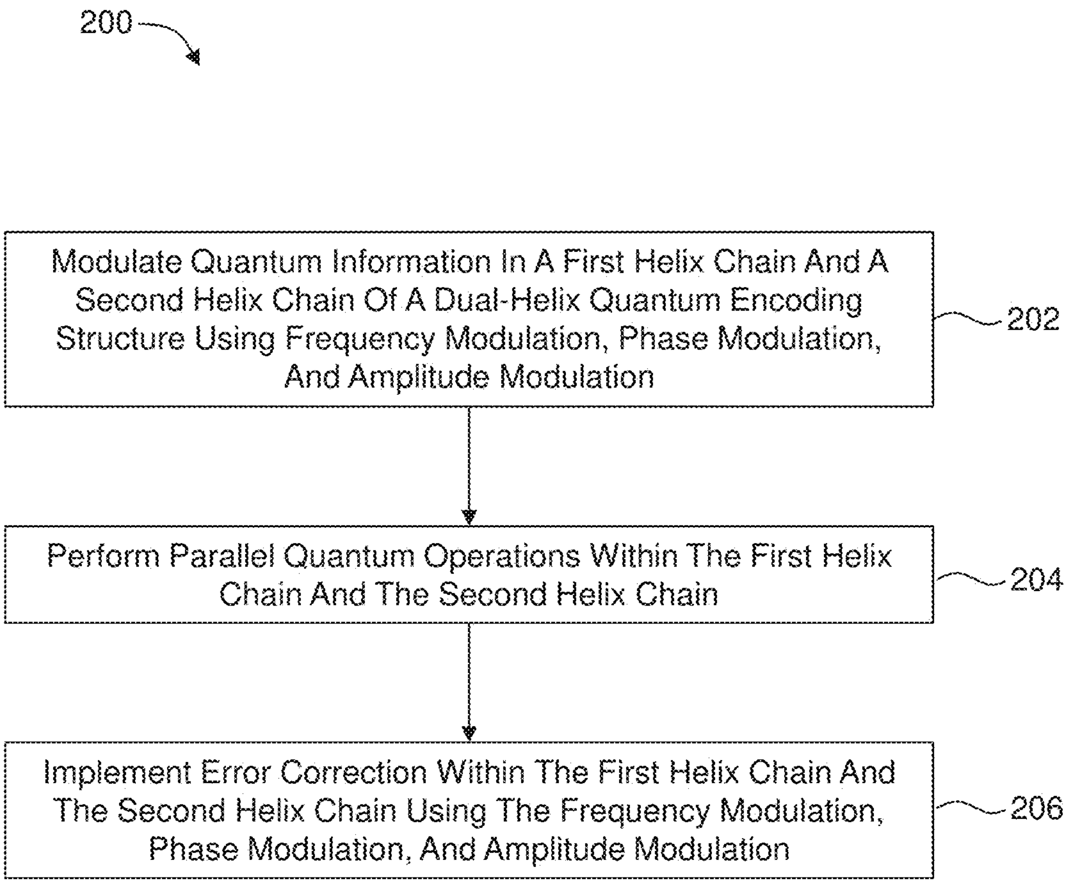
FIG. 2 depicts a flowchart of a method for quantum computing.

FIG. 2 depicts a flowchart 200 of a method for quantum computing, arranged in accordance with at least one embodiment described herein. The method 200 may be programmably performed or controlled by a processor in, e.g., a computer and/or server coupled to the classical computing interface 122. In an example implementation, the method 1200 may be performed in whole or in part by the system 100 of FIG. 1A under the control of a classical processor (coupled to the classical computing interface 122). Some embodiments herein may include a non-transitory computer-readable storage medium that includes computer-executable instructions executable by a processor device to perform or control performance of any operations herein, such as the operations of the method 200 of FIG. 2. The method 200 may include one or more of blocks 202, 204, and/or 206.

At block 202, the method 200 may include modulating quantum information in a first helix chain and a second helix chain of a dual-helix quantum encoding structure using frequency modulation, phase modulation, and amplitude modulation. For example, block 202 may include the controller 104, and specifically the phase modulator 154, frequency modulator 156, and/or amplitude modulator 158, modulating quantum information in the first helix chain 102A and the second helix chain 102B of the dual-helix structure 102. Block 202 may be followed by block 204.

At block 204, the method 200 may include performing parallel quantum operations within the first helix chain and the second helix chain. For example, block 204 may include the dual-helix structure performing parallel quantum operations within the first helix chain 102A and the second helix chain 102B as described with respect to the dual-helix structure 102 of FIG. 1A and/or the parallel processing dual-helix 146 of FIG. 1B. Block 204 may be followed by block 206.

At block 206, the method 200 may include implementing error correction within the first helix chain and the second helix chain using the frequency modulation, phase modulation, and amplitude modulation. For example, block 206 may include the error correction module 106, in whole or in part, implementing error correction within the first helix chain 102A and the second helix chain 102B.

One skilled in the art will appreciate that, for this and other processes and methods disclosed herein, the functions performed in the processes and methods may be implemented in differing order. Further, the outlined steps and operations are only provided as examples, and some of the steps and operations may be optional, combined into fewer steps and operations, or expanded into additional steps and operations without detracting from the essence of the disclosed embodiments.

For example, the method 200 may further include detecting phase drift between the first helix chain and the second helix chain, e.g., by a phase sensor of the sensors 114. In response to detecting the phase drift, the method 200 may further include synchronizing phases across the first helix chain and the second helix chain. Synchronizing the phases may be performed by the error correction module 106 and/or the controller 104 (or specifically the phase modulator 154). In some embodiments, synchronizing phases across the first helix chain and the second helix chain may reduce computational errors due to phase misalignment between the first helix chain and the second helix chain.

As another example, the method 200 may further include monitoring frequency modulation across the first helix chain and the second helix chain to detect frequency deviations in the first helix chain or the second helix chain. In response to detecting a frequency deviation, the method 200 may further include adjusting frequency of one or both of the first helix chain or the second helix chain to realign quantum states in the first helix chain and the second helix chain.

As another example, the method 200 may further include distributing quantum computing tasks across the first helix chain and the second helix chain. The method 200 may further include performing load balancing across the first helix chain and the second helix chain.

As another example, the method 200 may further include detecting errors in at least one of frequency modulation, phase modulation, or amplitude modulation in the first helix chain or the second helix chain. In response to detecting the errors, the method 200 may further include correcting detected errors using unaffected modulation dimensions to maintain quantum state coherence.

As another example, modulating quantum information at block 202 may include modulating frequency, phase, and amplitude of each of the first helix chain and the second helix chain in real-time. Alternatively or additionally, modulating quantum information at block 202 may include preventing overlap or signal degradation between the first helix chain and the second helix chain.

In some embodiments, the frequency modulation may represent basic quantum states. The phase modulation may control quantum superposition. The amplitude modulation may enhance error correction capabilities.

Alternatively or additionally, the method 200 may further include encoding quantum bits in the dual-helix quantum encoding structure using the frequency modulation, phase modulation, and amplitude modulation. Alternatively or additionally, the method 200 may further include processing multiple quantum states simultaneously using the frequency modulation, phase modulation, and amplitude modulation.

The foregoing specification is to be understood as being in every respect illustrative and exemplary, but not restrictive, and the scope of the invention disclosed herein is not to be determined from the specification, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The subject technology of the present disclosure is illustrated, for example, according to various aspects described below. Various examples of aspects of the present disclosure are described as numbered examples (1, 2, 3, etc.) for convenience. These are provided as examples and do not limit the present disclosure. The aspects of the various implementations described herein may be omitted, substituted for aspects of other implementations, or combined with aspects of other implementations unless context dictates otherwise. For example, one or more aspects of example 1 below may be omitted, substituted for one or more aspects of another example (e.g., example 2) or examples, or combined with aspects of another example The following is a non-limiting summary of some example implementations presented herein.

Example 1. A quantum computing system comprising:
a dual-helix quantum encoding structure comprising:
a first helix chain; and
a second helix chain; and
a multidimensional modulation controller configured to modulate quantum information in the first and second helix chains using two or more of frequency modulation, phase modulation, and amplitude modulation.

Example 2. The quantum computing system of any example herein, particularly of example 1, wherein each of the first helix chain and the second helix chain comprises at least one of high-transparency quartz, fused silica, silicon nitride (SiN), or lithium niobate (LiNbO3).

Example 3. The quantum computing system of any example herein, particularly of any one of examples 1-2, further comprising a phase coupling mechanism configured to:

detect phase drifts between the first helix chain and the second helix chain; and synchronize phases across the first helix chain and the second helix chain.

Example 4. The quantum computing system of any example herein, particularly of example 3, wherein the phase coupling mechanism is further configured to reduce computational errors due to phase misalignment between the first helix chain and the second helix chain.

Example 5. The quantum computing system of any example herein, particularly of any one of examples 1-4, further comprising a frequency monitoring and control system configured to:

monitor frequency modulation across the first helix chain and the second helix chain;

detect frequency deviations in the first helix chain or the second helix chain; and adjust frequencies to realign quantum states in the first helix chain or the second helix chain.

Example 6. The quantum computing system of any example herein, particularly of any one of examples 1-5, further comprising a task scheduler configured to distribute quantum computing tasks across the first helix chain and the second helix chain.

Example 7. The quantum computing system of any example herein, particularly of any one of examples 1-6, further comprising an error correction module configured to:

detect errors in at least one of frequency modulation, phase modulation, or amplitude modulation in the first helix chain or the second helix chain; and correct detected errors using unaffected modulation dimensions to maintain quantum state coherence.

Example 8. The quantum computing system of any example herein, particularly of any one of examples 1-7, wherein the multidimensional modulation controller is further configured to:

modulate frequency, phase, and amplitude of each of the first helix chain and the second helix chain in real-time; and prevent overlap or signal degradation between the first helix chain and the second helix chain.

Example 9. The quantum computing system of any example herein, particularly of any one of examples 1-8, further comprising a classical computing interface configured to:

receive classical data input;

convert the classical data input into quantum information suitable for processing by the dual-helix quantum encoding structure;

transmit the quantum information to the multidimensional modulation controller for modulation and processing in the first and second helix chains; and convert quantum computation results from the dual-helix quantum encoding structure back into classical data output.

Example 10. The quantum computing system of any example herein, particularly of any one of examples 1-9, wherein:

the frequency modulation represents basic quantum states;

the phase modulation controls quantum superposition; and the amplitude modulation enhances error correction capabilities.

Example 11. A method for quantum computing, the method comprising:

modulating quantum information in a first helix chain and a second helix chain of a dual-helix quantum encoding structure using frequency modulation, phase modulation, and amplitude modulation;

performing parallel quantum operations within the first helix chain and the second helix chain; and implementing error correction within the first helix chain and the second helix chain using the frequency modulation, phase modulation, and amplitude modulation.

Example 12. The method of any example herein, particularly of example 11, further comprising:

detecting phase drift between the first helix chain and the second helix chain; and in response to detecting phase drift, synchronizing phases across the first helix chain and the second helix chain.

Example 13. The method of any example herein, particularly of example 12, wherein synchronizing phases across the first helix chain and the second helix chain reduces computational errors due to phase misalignment between the first helix chain and the second helix chain.

Example 14. The method of any example herein, particularly of any one of examples 11-13, further comprising:

monitoring frequency modulation across the first helix chain and the second helix chain to detect frequency deviations in the first helix chain or the second helix chain; and in response to detecting a frequency deviation, adjusting frequency of the first helix chain or the second helix chain to realign quantum states in the first helix chain or the second helix chain.

Example 15. The method of any example herein, particularly of any one of examples 11-14, further comprising:

distributing quantum computing tasks across the first helix chain and the second helix chain; and performing load balancing across the first helix chain and the second helix chain.

Example 16. The method of any example herein, particularly of any one of examples 11-15, further comprising:

detecting errors in at least one of frequency modulation, phase modulation, or amplitude modulation in the first helix chain or the second helix chain; and correcting detected errors using unaffected modulation dimensions to maintain quantum state coherence.

Example 17. The method of any example herein, particularly of any one of examples 11-16, wherein modulating quantum information comprises:

modulating frequency, phase, and amplitude of each of the first helix chain and the second helix chain in real-time; and preventing overlap or signal degradation between the first helix chain and the second helix chain.

Example 18. The method of any example herein, particularly of any one of examples 11-17, wherein:

the frequency modulation represents basic quantum states;

the phase modulation controls quantum superposition; and the amplitude modulation enhances error correction capabilities.

Example 19. The method of any example herein, particularly of any one of examples 11-18, further comprising:

encoding quantum bits in the dual-helix quantum encoding structure using the frequency modulation, phase modulation, and amplitude modulation; and processing multiple quantum states simultaneously using the frequency modulation, phase modulation, and amplitude modulation.

Example 20. A non-transitory computer-readable storage medium comprising computer-executable instructions executable by a processor device to perform or control performance of operations comprising:

modulating quantum information in a first helix chain and a second helix chain of a dual-helix quantum encoding structure using frequency modulation, phase modulation, and amplitude modulation;

performing parallel quantum operations within the first helix chain and the second helix chain; and implementing error correction within the first helix chain and the second helix chain using the frequency modulation, phase modulation, and amplitude modulation.

The invention claimed is:

1. A quantum computing system comprising:

a dual-helix quantum encoding structure comprising:

a first helix chain having a plurality of designated quantum nodes; and a second helix chain having a plurality of designated quantum nodes;

one or more waveguides or dynamic couplers configured to route quantum-encoded photons between selected nodes of the first helix chain and the second helix chain; and a multidimensional modulation controller configured to perform node-specific modulation of quantum information at selected nodes of the first and second helix chains using two or more of frequency modulation, phase modulation, and amplitude modulation.

2. The quantum computing system of claim 1, wherein each of the first helix chain and the second helix chain comprises at least one of high-transparency quartz, fused silica, silicon nitride (SiN), or lithium niobate ($LiNbO_3$).

3. The quantum computing system of claim 1, further comprising a phase coupling mechanism configured to:

detect phase drifts between the first helix chain and the second helix chain; and synchronize phases across the first helix chain and the second helix chain.

4. The quantum computing system of claim 3, wherein the phase coupling mechanism is further configured to reduce computational errors due to phase misalignment between the first helix chain and the second helix chain.

5. The quantum computing system of claim 1, further comprising a frequency monitoring and control system configured to:

monitor frequency modulation across the first helix chain and the second helix chain;

detect frequency deviations in the first helix chain or the second helix chain; and adjust frequencies to realign quantum states in the first helix chain or the second helix chain.

6. The quantum computing system of claim 1, further comprising a task scheduler configured to distribute quantum computing tasks across the first helix chain and the second helix chain.

7. The quantum computing system of claim 1, further comprising an error correction module configured to:

detect errors in at least one of frequency modulation, phase modulation, or amplitude modulation in the first helix chain or the second helix chain; and correct detected errors using unaffected modulation dimensions to maintain quantum state coherence.

8. The quantum computing system of claim 1, wherein the multidimensional modulation controller is further configured to:

modulate frequency, phase, and amplitude of each of the first helix chain and the second helix chain in real-time; and prevent overlap or signal degradation between the first helix chain and the second helix chain.

9. The quantum computing system of claim 1, further comprising a classical computing interface configured to:

receive classical data input;

convert the classical data input into quantum information suitable for processing by the dual-helix quantum encoding structure;

transmit the quantum information to the multidimensional modulation controller for modulation and processing in the first and second helix chains; and convert quantum computation results from the dual-helix quantum encoding structure back into classical data output.

10. The quantum computing system of claim 1, wherein:

the frequency modulation represents basic quantum states;

the phase modulation controls quantum superposition; and the amplitude modulation enhances error correction capabilities.

11. A method for quantum computing, the method comprising:

modulating quantum information at selected nodes of a first helix chain and a second helix chain of a dual-helix quantum encoding structure using frequency modulation, phase modulation, and amplitude modulation, wherein each of the first helix chain and the second helix chain has a plurality of designated quantum nodes;

routing quantum-encoded photons between selected nodes of the first helix chain and the second helix chain using one or more waveguides or dynamic couplers;

performing parallel quantum operations within the first helix chain and the second helix chain; and implementing error correction within the first helix chain and the second helix chain using the frequency modulation, phase modulation, and amplitude modulation.

12. The method of claim 11, further comprising:

detecting phase drift between the first helix chain and the second helix chain; and in response to detecting phase drift, synchronizing phases across the first helix chain and the second helix chain.

13. The method of claim 12, wherein synchronizing phases across the first helix chain and the second helix chain reduces computational errors due to phase misalignment between the first helix chain and the second helix chain.

14. The method of claim 11, further comprising:

monitoring frequency modulation across the first helix chain and the second helix chain to detect frequency deviations in the first helix chain or the second helix chain; and in response to detecting a frequency deviation, adjusting frequency of the first helix chain or the second helix chain to realign quantum states in the first helix chain or the second helix chain.

15. The method of claim 11, further comprising:

distributing quantum computing tasks across the first helix chain and the second helix chain; and performing load balancing across the first helix chain and the second helix chain.

16. The method of claim 11, further comprising:

detecting errors in at least one of frequency modulation, phase modulation, or amplitude modulation in the first helix chain or the second helix chain; and correcting detected errors using unaffected modulation dimensions to maintain quantum state coherence.

17. The method of claim 11, wherein modulating quantum information comprises:

modulating frequency, phase, and amplitude of each of the first helix chain and the second helix chain in real-time; and preventing overlap or signal degradation between the first helix chain and the second helix chain.

18. The method of claim 11, wherein:

the frequency modulation represents basic quantum states;

the phase modulation controls quantum superposition; and the amplitude modulation enhances error correction capabilities.

19. The method of claim 11, further comprising:

encoding quantum bits in the dual-helix quantum encoding structure using the frequency modulation, phase modulation, and amplitude modulation; and processing multiple quantum states simultaneously using the frequency modulation, phase modulation, and amplitude modulation.

20. A non-transitory computer-readable storage medium comprising computer-executable instructions executable by a processor device to perform or control performance of operations comprising:

modulating quantum information at selected nodes of a first helix chain and a second helix chain of a dual-helix quantum encoding structure using frequency modulation, phase modulation, and amplitude modulation, wherein each of the first helix chain and the second helix chain has a plurality of designated quantum nodes;

routing quantum-encoded photons between selected nodes of the first helix chain and the second helix chain using one or more waveguides or dynamic couplers;

performing parallel quantum operations within the first helix chain and the second helix chain; and implementing error correction within the first helix chain and the second helix chain using the frequency modulation, phase modulation, and amplitude modulation.

* * * * *